United States Patent
Takayama et al.

(10) Patent No.: US 6,326,435 B1
(45) Date of Patent: Dec. 4, 2001

(54) POLYESTER RESIN COMPOSITION

(75) Inventors: Katsunori Takayama; Kazuhito Kobayashi, both of Fuji (JP)

(73) Assignee: Polyplastics Co., Ltd. (JP)

( * ) Notice: Subject to any disclaimer, the term of this patent is extended or adjusted under 35 U.S.C. 154(b) by 0 days.

(21) Appl. No.: 09/674,680

(22) PCT Filed: Mar. 8, 2000

(86) PCT No.: PCT/JP00/01401

§ 371 Date: Nov. 3, 2000

§ 102(e) Date: Nov. 3, 2000

(87) PCT Pub. No.: WO00/55256

PCT Pub. Date: Sep. 21, 2000

(30) Foreign Application Priority Data

Mar. 12, 1999 (JP) .................................................. 11-067190

(51) Int. Cl.$^7$ ...................................................... C08F 8/00
(52) U.S. Cl. ........................ 525/196; 528/271; 528/295.5; 528/302; 528/303; 525/55; 525/64; 525/65; 525/69; 525/166; 525/167.5; 525/191; 525/195; 525/222; 525/240; 525/445; 524/81; 524/115; 524/177; 524/179; 524/380; 524/464
(58) Field of Search .................................. 528/271, 295.5, 528/302, 303; 525/55, 64, 69, 165, 166, 167.5, 191, 195, 196, 222, 240, 445; 524/81, 115, 174, 177, 380, 464

(56) References Cited

FOREIGN PATENT DOCUMENTS

| 0 406 010 A1 | 1/1991 | (EP) . |
|---|---|---|
| 3-35050 | 2/1991 | (JP) . |
| 5-9369 | 1/1993 | (JP) . |
| 7-150022 | 6/1995 | (JP) . |

*Primary Examiner*—Samuel A. Acquah
(74) *Attorney, Agent, or Firm*—Nixon & Vanderhye P.C.

(57) ABSTRACT

The polyester resin composition of the present invention comprises (A) a thermoplastic polyester resin, (B) an olefinic polymer modified with at least one member selected from the group consisting of an unsaturated carboxylic acid and its derivative, and (C) an aliphatic ester having a molecular weight of 400 to 1,000. The polyester resin of the present invention may comprises: (D) a flame retardant, (E) an inorganic flame retardant auxiliary, and others. The thermoplastic polyester resin composition is useful for the fabrication of sliding members (particularly, gears). Polyester resin compositions with improved dimensional accuracy and sliding properties and shaped articles formed therefrom can be obtained from the resin composition of the present invention.

25 Claims, No Drawings

POLYESTER RESIN COMPOSITION

TECHNICAL FIELD

This invention relates to a thermoplastic resin composition which comprises a thermoplastic polyester resin, a specific modified polyolefinic polymer and an ester compound and is useful in providing a sliding member having excellent abrasion/wear resistance, a process for producing the same, and to a shaped article made therefrom.

BACKGROUND ART

Owing to their excellent mechanical and electrical properties as well as other physical and chemical properties and good processability, crystalline thermoplastic polyester resins (e.g., polyalkylene terephthalate resins) have been used extensively as engineering plastics in the production of automotive parts, electric or electronic device parts, and others. Although these crystalline thermoplastic polyester resins can be shaped into a variety of articles singly, depending on the field of use, various reinforcing agents or additives are added thereto to improve their properties, particularly mechanical properties.

However, there is a tendency in such fields toward ever-better properties or characteristics. For example, further improvement in sliding characteristics or dimensional accuracy has been desired. For instance, driving mechanisms for video tape recorders, tape recorders, and printers capable of providing further improved sound or picture quality have been desired. In these operation mechanisms, the dimensional accuracy of the sliding members (e.g., gears) as main driving members is one of the important subjects of further investigation, for their dimensional accuracy is directly and deeply related to the quality of sound reproduction or printing. Further, their initial dimensional accuracy is desired to be maintained even through a long-term service. Materials that show excellent abrasion/wear resistance against gears and shafts (e.g., metal shafts) also have been desired.

From the viewpoint of safety, members constituting the operation mechanisms of printers and facsimiles also are required to be flame-retardant. Until now, resin materials having flame retardancy, sliding characteristics, and molding accuracy all at high levels have no yet been found, and generally, grease is put on a conventional inflammable material or an flammable material such as polyacetal is used. However, a toner for printing is caught by grease and clings to a gear, hindering the driving stability of the gear and remarkably accelerating the wear of the gear. In addition, so that the material of the gear itself is poor in wear resistance against a gear of the same material and in sliding characteristics against metal, if the gear ran out of grease, the performance of the gear will be lowered largely.

Conventionally, a sliding member (e.g., a gear) is made from a material blended with a fluorine-containing resin. However, its reduced gear accuracy due to the anisotropy of the fluorine-containing resin or poor accuracy as a result of mold deposit due to the separation of the fluorine-containing resin from the polyester resin, and the wear of the gear against a member of metal or of the same material have not yet been improved to satisfactory levels, and therefore, materials with improved wear resistance have been desired.

Japanese Patent Application Laid-Open No. 9369/1993 (JP-5-9369A) discloses a resin composition comprised of a polyester-series resin and a polyolefinic resin dispersed therein in a specific state thereby to improve the sliding characteristics and molding processability. However, the combination of a polyester-series resin and a polyolefinic resin does not improve the dimensional accuracy and sliding characteristics largely. Japanese Patent Application Laid-Open No. 35050/1991 (JP-3-35050A) discloses a resin composition comprising, in order to improve the moldability and inhibit the occurrence of surface delamination phenomenon, a thermoplastic polyester resin; an ethylene-α-olefin co-polymer grafted with an unsaturated carboxylic acid, or an ethylene-unsaturated carboxylic acid ester copolymer; and a bisoxazoline compound. This literature says that the resin composition may comprise a fatty acid ester of a polyhydric alcohol. However, it cannot be said that such resin composition and a shaped article made therefrom always have improved moldability or sliding characteristics. Japanese Patent Application Laid-Open No.150022/1995 (JP-7-150022A) discloses a polyester resin having good sliding characteristics, the resin comprising a crystalline thermoplastic polyester resin, an olefinic polymer comprised of an olefinic polymer fragment and a vinyl-series polymer fragment, and a fatty acid ester obtained from a fatty acid having 12 or more carbon atoms. However, the moldability and sliding characteristics of these resin compositions are still unsatisfactory.

Thus, an object of the present invention is to provide a polyester resin composition with largely improved dimensional accuracy and sliding characteristics, a process for producing the same, a shaped article formed from the same, a resin composition with improved sliding characteristics, and a process for improving sliding characteristics.

Another object of the present invention is to provide a polyester resin composition having good flame retardancy as well as good dimensional accuracy and sliding characteristics, and a shaped article formed therefrom.

DISCLOSURE OF INVENTION

The inventors of the present invention made extensive and intensive studies to solve the problems mentioned above, and finally found that a composition which is not only excellent in moldability but shows excellent sliding characteristics can be obtained from the combination of a thermoplastic polyester resin, a specific modified polyolefinic copolymer, and an aliphatic ester having a specific molecular weight. The present invention was accomplished based on the above findings.

That is, the polyester resin composition of the present invention comprises: (A) a thermoplastic polyester resin, (B) an olefinic polymer modified with at least one member selected from the group consisting of an unsaturated carboxylic acid and its derivatives, and (C) an aliphatic ester having a molecular weight of 400 to 1,000. The thermoplastic polyester resin (A) may be a polyalkylene arylate-series resin (particularly, polybutylene terephthalate-series resin). The modified olefinic polymer (B) may be an olefinic polymer modified (in particular, grafted) with an unsaturated carboxylic acid or a derivative thereof (e.g., maleic anhydride, (meth)acrylic acid). In the modified olefinic polymer(B), the degree of modification by the unsaturated carboxylic acid or its derivative may be about 0.1 to 5% by weight. The olefinic polymer may be a homo- or copolymer of an olefinic monomer (e.g., ethylene, propylene), or a co-polymer of the olefinic monomer with an α,β-unsaturated carboxylic acid ester (e.g., (meth)acrylic acid $C_{1-4}$ alkyl ester). The aliphatic ester (C) may be an ester of a straight chain $C_{10-30}$ fatty acid with an alcohol typified by a straight chain $C_{8-30}$ aliphatic alcohol, a $C_{2-20}$ alkylene diol, a $C_{3-8}$ alkane triol and a $C_{4-8}$ alkane tetraol. The content of the modified olefinic polymer (B) per 100 parts by weight of the thermoplastic polyester resin (A) is about 0.5 to 18 parts by weight, and the content of the aliphatic ester (C) is about 0.2 to 8 parts by weight. The ratio of the modified olefinic polymer (B) to the aliphatic ester (C) is about 95/5 to 30/70. The polyester resin composition of the present invention may comprise (D) a flame retardant, (E) a flame retardant auxiliary (particularly, an inorganic flame retardant auxiliary), and others. The content of the flame retardant (D) per 100 parts by weight of the thermoplastic polyester resin (A) is about 0.5 to 25 parts by weight, and that of the inorganic flame retardant auxiliary (E) is about 0.1 to 20 parts by weight.

In the present invention, the components (A), (B), and (C) mentioned above are mixed together to produce a polyester resin composition. In the process, a flame retardant (D) or an inorganic flame retardant auxiliary (E) may further be added.

The polyester resin composition is useful in providing a shaped article such as a sliding member (particularly, gears).

The present invention further includes: a resin composition which comprises (A) a polyester-series resin as a base resin (particularly, a polybutylene terephthalate-series resin), (B) a modified olefinic polymer and (C) an aliphatic ester, the resin composition being substantially free from a bisoxazoline compound and having improved sliding characteristics; and a process for improving the sliding characteristics of a shaped article by using the resin composition of the present invention.

In the specification of the present invention, the terms "acrylic monomers" and "methacrylic monomers" are sometimes collectively referred to as "(meth)acrylic monomers".

BEST MODE FOR CARRYING OUT THE INVENTION

[Thermoplastic Polyester Resin (A)]

The thermoplastic polyester resin (A) used in the present invention is obtained by the polycondensation of a dicarboxylic acid component and a dihydroxy component, the polycondensation of an hydroxycarboxylic acid component, or the polycondensation of these three components. The thermoplastic polyester resin (A) is a homopolyester or copolymer, and either will do.

Exemplified as the dicarboxylic acid component are aromatic carboxylic acids (e.g., $C_{8-16}$ aromatic dicarboxylic acids such as terephtalic acid, isophthalic acid, phthalic acid, naphthalenedicarboxylic acids (e.g., 2,6-naphthalenedicarboxylic acid), diphenylcarboxylic acid, diphenyletherdicarboxylic acid, diphenylmethanedicarboxylic acid, and diphenylethanedicarboxylic acid), alicyclic dicarboxylic acids (e.g., $C_{4-10}$ cycloalkanedicarboxylic acids such as cyclohexanedicarboxylic acid), aliphatic dicarboxylic acids (e.g., $C_{6-12}$ aliphatic dicarboxylic acids such as adipic acid, azelaic acid, and sebacic acid), and derivatives thereof. Examples of the derivatives are those capable of forming esters, such as lower alkyl esters such as dimethyl ester, acid anhydrids, and acid halides such as acid chlorides). These dicarboxylic acids can be used either singly or in combination. Preferred as the dicarboxylic acid component are aromatic dicarboxylic acids (particularly, terephthalic acid, naphthalenedicarboxylic acid).

As the dihydroxy component, there are exemplified aliphatic diols (e.g., $C_{2-10}$ alkylene diols such as ethylene glycol, propylene glycol, 1,3-butanediol, 1,4-butanediol, neopentyl glycol, and hexane diol), alicylic diols (e.g., $C_{4-12}$ alicyclic diols such as cyclohexane diol and cyclohexane dimethanol), aromatic diols (e.g., $C_{6-16}$ aromatic diols such as hydroquinone, resorcin, dihydroxyphenyl, naphthalenediol, dihydroxydiphenyl ether, 2,2-bis(4-hydroxyphenyl)propane(bisphenol A)), alkylene oxide adducts of the above-mentioned aromatic diols (e.g., $C_{2-4}$ alkylene oxide adducts of bisphenol A such as diethoxylated bisphenol A), and polyoxyalkylene glycols (e.g., polyoxy$C_{2-4}$alkylene glycols such as polyoxyethylene glycol, polyoxypropylene glycol, and polytetramethylene ether glycol). These dihydroxy components may be derivatives capable of forming esters, such as alkyl-, alkoxy-, or halogen-substituted dihydroxy compounds. These diol components can be used either singly or in combination. Of these dihydroxy components, an alkylene diol (particularly, a $C_{2-4}$alkylene diol) or an alicyclic diol is generally employed.

Exemplified as the hydroxycarboxylic acid are hydroxycarboxylic acids such as hydroxybenzoic acid, oxynaphthoic acid and diphenyleneoxycarboxylic acid, and derivatives thereof. Included among the derivatives are derivatives of the dicarboxylic acid component and of the dihydroxy component. These compounds are also used either singly or in combination. If necessary, along with the hydroxycarboxylic acid component, a small amount of a multifunctional monomer, such as a polycarboxylic acid typified by trimellitic acid, trimesic acid, and pyrrolimetic acid (pyrromellitic acid), and a polyhydric alcohol typified by glycerol, trimethylolpropane, trimethylolethane and pentaerythritol, is used. Branched or crosslinked polyesters resulting from the use of these multifunctional monomers are also available.

A thermoplastic polyester which is formed through the polycondensation of a compound(s) of those exemplified above as a monomer component(s) is used either singly or in combination and serves as the base resin of the thermoplastic resin composition. Although it does not matter whether the polyester resin is crystalline or not, it is preferred that the polyester resin is crystalline.

Examples of preferred thermoplastic polyester resins (A) are crystalline aromatic polyesters, such as polyalkylene arylate-series resins (i.e., homo- or copolyester resins the main component of which is an alkylene arylate unit, or resin compositions the main component of which is such homo- or copolyester resin). Included among the homopolyester resins are polyalkylene arylates (e.g., poly$C_{2-4}$alkylene terephthalates such as polyethylene terephthalate and polybutylene terephthalate, poly$C_{2-4}$alkylene naphthalates such as polyethylene naphthalate and polybutylene naphthalate). The copolyester resins include a polyalkylene arylate containing at least 60% by weight of an alkylene arylate unit [e.g., copolymers containing about 60 to 98% by weight of an alkylene arylate unit (particularly, butylene terephthalate)]. Preferred comonomers for the copolyester are $C_{2-4}$ alkylene glycols, polyoxy$C_{2-4}$alkylene glycols, isophthalic acid, and phthalic acid. Included among the polyalkyl arylate-series resin compositions are compositions containing, on the alkylene arylate unit basis, at least 60% by weight (e.g., about 60 to 95% by weight) of the homopolyester resin (particularly, polybutylene terephthalate) or the copolyester resin (particularly, polybutylene terephthalate-series copolyester). Particularly, polybutylene terephthalate-series resins (polybutylene terephthalate, copolybutylene terephthalate (copolymer), and resin compositions containing a homo- or copolybutylene terephthalate are preferred.

The intrinsic viscosity of the polyester resin such as polybutylene terephthalate (solvent: o-chlorophenol, temperature: 25° C.) is not less than 0.5 dl/g, preferably about 0.6 to 1.5 dl/g, more preferably about 0.7 to 1.0 dl/g. If the intrinsic viscosity is less than 0.5 dl/g, the mechanical properties of the resin composition will be lowered, and an intrinsic viscosity exceeding 1.5 dl/g leads to deterioration in flowability of the resin composition upon molding.

[Modified Olefinic Polymer (B)]

The modified olefinic polymer used in the present invention as the component (B) is an olefinic polymer (b-1) modified with at least one member selected from unsaturated carboxylic acids and derivatives thereof (b-2).

Included among the examples of the olefinic polymer (b-1) are a homo- or copolymer of an olefinic monomer, and a copolymer of an olefinic monomer with at least one member selected from α, β-unsaturated carboxylic acids and their esters. The homo- or copolymer of an olefinic monomer comprises at least one monomer selected from olefinic monomers. The copolymer of an olefinic monomer with an α, β-unsaturated carboxylic acid or an ester thereof comprises at least one monomer selected from olefinic monomers and at least one monomer selected from α, β-unsaturated carboxylic acids and esters thereof. Any of these olefinic polymers is preferably used. The copolymer may be a random, block, or graft copolymer.

Exemplified as the olefinic monomer are unsaturated hydrocarbon monomers such as α-olefins (e.g., α-olefins having 2 to 20 carbon atoms (preferably, 2 to 16, more preferably 2 to 10 carbon atoms) typified by ethylene, propylene, 1-butene, 2-butene, isobutene, 3-methyl-1-butene, 2-methyl-2-butene, 1-hexene, 2,3-dimethyl-2-butene, 1-heptene, 1-octene, 1-nonene, 1-decene, and 1-dodecene. These monomers can be used either singly or in combination. At least ethylene or propylene (particularly, ethylene) is included among the preferred olefinic monomers.

Examples of the α, β-unsaturated carboxylic acids and esters thereof are α, β-unsaturated carboxylic acids (e.g., (meth)acrylic acid), (meth)acrylates (e.g., (meth)acrylic acid $C_{1-10}$(preferably $C_{1-6}$)alkyl esters typified by methyl (meth) acrylate, ethyl (meth)acrylate, propyl (meth)acrylate, butyl (meth)acrylate, and 2-ethylhexyl (meth)acrylate; and (meth) acrylic acid hydroxy$C_{2-6}$ (preferably, $C_{2-4}$)alkyl esters such as hydroxyethyl (meth)acrylate and hydroxypropyl (meth) acrylate). Preferred α, β-unsaturated carboxylic acid esters are (meth)acyrlic acid $C_{1-4}$alkyl esters such as methyl (meth) acrylate, ethyl (meth)acrylate, propyl (meth)acrylate, and butyl (meth)acrylate, with acrylic acid $C_{1-4}$alkyl esters (ethyl acrylate) particularly preferred. These α, β-unsaturated carboxylic acids or esters thereof can be used either singly or in combination. The amount of an α, β-unsaturated carboxylic acid or its ester can be selected within the range of, relative to the total amount of the monomer, about 0 to 30 mol %, preferably about 1 to 20 mol %.

Besides the components described above, the olefinic monomer may be used along with a non-conjugated diene compound (e.g., a non-conjugated diene having 6 to 10 carbon atoms such as 1, 4-hexadiene, dicyclopentadiene, 5-ethylidene-2-norbornene, and 2. 5-norbonadiene (2,5-norbornadiene)), a conjugated diene (e.g., a conjugated diene compound having 4 to 6 carbon atoms such as butadiene, isoprene, and piperylene, an aromatic vinyl compound (e. g., styrene, α-methylstyrene), a vinyl ether (e.g., vinyl methyl ether), or a polydiorganosiloxane having a vinyl group (vinyl-containing silicone) provided that the effects of the present invention are not adversely affected.

Concrete examples of the olefinic polymer (b-1) are polyethylene, polypropylene, ethylene-propylene copolymer, and $C_{2-3}$olefine-(meth)acrylic acid $C_{1-4}$alkyl ester copolymers (e.g., ethylene-methyl (meth)acrylate copolymer, ethylene-ethyl (meth)acrylate copolymer).

Exemplified as the unsaturated carboxylic acid or its derivative (b-2) are unsaturated carboxylic acids (e.g., maleic acid, citraconic acid, itaconic acid, tetrahydrophthalic acid, nadic acid, methylnadic acid, allylsuccinic acid, (meth)acrylic acid) and derivatives thereof (e.g., acid anhydrides such as maleic anhydride). These modifying components can be used either singly or in combination. Usually, maleic anhydride is used.

In the modified olefinic polymer (B), the degree of modification by the unsaturated carboxylic acid or its derivative (b-2) (the amount of introduction, or the amount of the unsaturated carboxylic acid or its ester grafted onto the olefinic polymer) is, relative to the total amount of the modified olefinic polymer (B), about 0.1 to 5% by weight (0.1 to 4% by weight), more preferably about 0.5 to 3% by weight. If the degree of modification by the unsaturated carboxylic acid or its derivative (b-2) is too low, the modified olefinic polymer (B) will be separated from the thermoplastic polyester component (A) considerably, and the possibilities of delamination and mold deposition upon molding may arise. On the other hand, if the degree of modification by the unsaturated carboxylic acid or its derivative (b-2) is too high, the modified olefinic polymer (B) will have such a defect as the generation of a nasty smell due to the component (b-2) remaining unreacted.

Exemplified as the process for providing the modified olefinic polymer (B) are a process (a process for forming a graft copolymer) in which an unsaturated carboxylic acid or its derivative (b-2) is heated together with a suitable radical initiator (e.g., an organic peroxide) and, in a melting state, grafted onto an olefinic polymer (b-1), a process in which a monomer containing at least an olefinic monomer is polymerized with an unsaturated carboxylic acid and/or its derivative (b-2), and other processes. Particularly, the process of graft-copolymerizing an unsaturated carboxylic acid and/or its derivative (b-2) onto an olefinic polymer (b-1) is easy in control of the proportion of each component.

Exemplified as the modified olefinic polymer (B) are olefinic polymers modified with maleic anhydride [e.g., maleic anhydride-modified polyethylene, maleic anhydride-modified polypropylene, maleic anhydride-modified (ethylene-methyl (meth)acrylate copolymer), maleic anhydride-modified (ethylene)-ethyl (meth)acrylate)], and (meth)acrylic acid-modified olefinic polymers corresponding to these polymers.

A plurality of modified olefinic polymers (B) may be used in combination. For example, combinations of maleic anhydride-modified polyethylene and maleic anhydride (ethylene-ethyl acrylate copolymer) and of maleic anhydride-modified polypropylene and maleic anhydride-modified (ethylene-methyl methacrylate copolymer) are available.

In the polyester resin composition of the present invention, the amount of the modified olefinic polymer (B) added thereto is, relative to 100 parts by weight of the thermoplastic polyester resin (A), about 0.5 to 18 parts by weight (e.g., 1 to 15 parts by weight), preferably about 1 to 10 parts by weight (e.g., 2 to 8 parts by weight). If the amount of the component (B) is smaller than 0.5 part by weight, such characteristics as sliding characteristics are not largely improved. If the amount of the component (B) exceeds 18 parts by weight, the wear resistance and rigidity of the resin composition will be deteriorated. The dimensional accuracy and external appearance of a shaped article made therefrom are also degraded.

[Aliphatic Ester (C)]

The aliphatic ester (C) used in the present invention is composed of a fatty acid and an aliphatic alcohol. Examples of the fatty acid are straight- or branched-chain saturated fatty acids (e.g., saturated higher $C_{10-30}$ (preferably, $C_{12-26}$) fatty acids such as lauric acid, tridecanoic acid, myristic acid, palmitic acid, stearic acid, isostearic acid, behenic acid, arachidic acid, lignoceric acid, cerotic acid, montanic acid, and melissic acid); straight or branched-chain unsaturated fatty acids [e.g., unsaturated higher $C_{10-30}$ (preferably, $C_{14-26}$, more preferably $C_{18-20}$) fatty acids) such as oleic acid, linoleic acid, linolenic acid); polybasic acids (polybasic acids having 2 to 10 carbon atoms such as succinic acid, adipic acid, and sebacic acid); and derivatives of the above-mentioned fatty acids (e.g., halogenated fatty acids such as 2-bromostearic acid and 18-bromostearic acid, hydroxy-substituted fatty acids such as 18-hydroxystearic acid). These fatty acids can be used either singly or in combination. Preferred as the fatty acid are saturated $C_{12-24}$ (preferably, $C_{14-24}$) fatty acids (e.g., myristic acid, palmitic acid, stearic acid, behenic acid), and unsaturated $C_{18-20}$ fatty acids (e.g., oleic acid).

Exemplified as the aliphatic alcohol are monohydric straight or branched-chain saturated aliphatic alcohols (e.g., saturated higher $C_{8-30}$ (preferably, $C_{10-26}$) aliphatic alcohols such as n-octyl alcohol, 2-ethylhexyl alcohol, isononyl alcohol, n-decyl alcohol, isodecyl alcohol, lauryl alcohol, myristyl alcohol, cetyl alcohol, 14-methylhexadecan-1-ol, stearyl alcohol, 16-methylheptadecanol, 18-methylnonadecanol, 18-methyleicosanol, docosanol, 20-methyleicosanol, 20-methyldocosanol, tetracosanol, hexacosanol, and octacosanol), monohydric straight- or branched chain unsaturated aliphatic alcohol (unsaturated higher $C_{10-26}$ (preferably, $C_{16-20}$) aliphatic alcohols such as oleyl alcohol), polyhydric alcohols (e.g., $C_{2-20}$ (preferably $C_{2-10}$, more preferably $C_{2-8}$) alkylene diols such as ethylene glycol, propylene glycol, 1,4-butanediol, 1,5-pentanediol, 1,6-hexanediol, 1,2-octanediol, hexadecane-1,2-diol, octadecane-1,2-diol, and eicosane-1,2-diol; $C_{6-20}$ (preferably, $C_{6-16}$, more preferably $C_{8-10}$)cycloalkanediols such as 1,2-cyclononanediol and 1,2-cyclodecanediol; $C_{3-8}$ (preferably $C_{3-6}$)alkanetriols such as glycerol and trimethylolpropane; $C_{4-8}$ (preferably $C_{4-5}$)alkanetetraols such as erythritol and pentaerythritol; and hexaols such as sorbitol), and condensates of the above-listed polyhydric alcohols (e.g., dipentaerythritol, tripentaerythritol, diethylene glycol, diglycerol, triglycerol). These aliphatic alcohols can be used either singly or in combination. Included among the preferred aliphatic alcohols are monohydric saturated higher $C_{12-24}$ (preferably, $C_{14-24}$) alcohols (e.g., myristyl alcohol, cetyl alcohol, stearyl alcohol, behenyl alcohol), monohydric unsaturated higher $C_{16-20}$ alcohols (e.g., oleyl alcohol), $C_{2-6}$ alkylenediols, $C_{3-6}$ alkanetriols, and $C_{4-6}$ alkanetetraols.

Although it is not critical that whether the chains of the fatty acid and the alcohol described above are straight or branched, it is preferred that they are straight. Incidentally, the term "straight" means that the long carbon chain constituting the fatty acid or the alcohol is straight.

For avoiding the transesterification with a polyester resin, it is preferred that the aliphatic ester (C) is a full ester substantially containing no free hydroxyl or carboxyl group (e.g., acid value=0 to 5 KOH mg/g (0 to 2 KOH mg/g)).

Preferably used as the aliphatic ester (C) is an ester of a saturated $C_{12-24}$ (preferably, $C_{14-24}$) fatty acid with a mono$C_{12-24}$ (preferably, $C_{14-24}$) alcohol (e.g., tridecyl stearate, isotridecyl stearate, myristyl myristate, cetyl palmitate, stearyl stearate, isostearyl stearate, behenyl behenate, oleyl oleate); an ester of a $C_{2-6}$(preferably, $C_{2-4}$) alkylenediol with a saturated $C_{12-24}$ (preferably, $C_{14-24}$) fatty acid (e.g., ethylene glycol distearate); or an ester of a $C_{3-6}$ alkanetriol or a $C_{4-6}$ alkanetetraol with a saturated $C_{12-24}$ (preferably, $C_{14-24}$) fatty acid (e.g., glycerol tristearate).

In the polyester resin composition of the present invention, the molecular weight of the aliphatic ester (C) exerts a great influence on wear resistance, smoothness of feed of the composition into an extruder, or accuracy of measurement. The molecular weight of the aliphatic ester (C) to be used in the present invention is within the range of about 400 to 1,000 (e.g., 420 to 950), preferably about 400 to 900 (e.g., 420 to 900), more preferably about 400 to 800 (e.g., 430 to 750). If the molecular weight of the component (C) is smaller than 400, moldability-related properties such as measurement stability and wear resistance will be considerably damaged. If the molecular weight exceeds 1,000, abrasion/wear resistance cannot be improved to a satisfactory level.

In the polyester resin composition of the present invention, the amount of the aliphatic ester (C) to be added is, relative to 100 parts by weight of the thermoplastic polyester resin (A), about 0.2 to 8 parts by weight, preferably about 0.5 to 5 parts by weight, more preferably about 1 to 4 parts by weight. If the amount of the component (C) is smaller than 0.2 part by weight, the lubricity of the polyester resin composition will be impaired. If larger than 8 parts by weight, the properties of the thermoplastic polyester resin being the base (base resin) will be impaired drastically.

The ratio of the modified olefinic polymer (B) to the aliphatic ester (C) is the former/the latter=about 95/5 to 30/70, preferably about 90/10 to 40/60, more preferably about 85/15 to 50/50.

[Flame Retardant (D)]

The polyester resin of the present invention may comprise a flame retardant (D). Any compound generally employed as a flame retardant for thermoplastic polyester resins is available as the flame retardant (D) unless it deteriorates the abrasion/wear resistance. Preferred flame retardants (D) are organic halogen compounds (e.g., phenyl halides, diphenyl halides, halogenated aromatic bisimide compounds, halogenated aromatic epoxidized compounds, low-molecular weight organic halides of bisphenol A, halogenated polycarbonate, halogenated polystyrene), and phosphates. Although the halogen atoms of the organic halides may be fluorine, chlorine, bromine, or iodine atoms and any of these will do, organic halides of bromine are generally employed. Examples of the phosphates are aliphatic phosphates [e.g., tri$C_{1-0}$alkyl phosphates such as trimethyl phosphate, triethyl phosphate, tripropyl phosphate, trilsopropyl phosphate, tributyl phosphate, and truisobutyl phosphate; di$C_{1-10}$alkyl phosphates such as dimethyl phosphate, diethyl phosphate, dipropyl phosphate, dibutyl phosphate, and di(2-ethylhexyl) phosphate; mono$C_{1-10}$alkyl phosphates]; aromatic phosphates [e.g., tri$C_{6-20}$aryl phosphates such as triphenyl phosphate, tricresyl phosphate, trixylyl phosphate, diphenylcresyl phosphate, tri(isopropylphenyl) phosphate, and diphenylethylcresyl phosphate], and aliphatic-aromatic phosphates (e.g., methyldiphenyl phosphate, phenyldiethyl phosphate). These flame retardants (D) can be used either singly or in combination. Preferred as the flame retardant is a halogen-containing organic flame retardant, or the like.

The content of the flame retardant (D) is, relative to 100 parts by weight of the thermoplastic polyester resin (A), about 0.5 to 25 parts by weight, preferably about 1 to 20 parts by weight (e.g., 2 to 20 parts by weight). If the flame retardant is added to the polyester resin (A) excessively, not only will the mechanical properties, physical properties, heat stability, and other properties of the polyester resin composition become worse, but the external appearance of a shaped article formed from the resin composition tends will be impaired. On the other hand, if the amount of the flame retardant added was too small, to improve the flame retardancy of the resin composition becomes difficult.

[Flame Retardant Auxiliary (E)]

In the present invention, a flame retardant auxiliary (E) may be used in combination with the flame retardant (D). Any known compound generally employed as a flame retardant auxiliary (particularly, an inorganic flame retardant auxiliary) for thermoplastic polyester resins is available as the flame retardant auxiliary (E), provided that the abrasion properties being the object of improvement are not impaired. Included among the preferred flame retardant auxiliaries (E) are inorganic flame retardant auxiliaries such as metal oxides (e.g., antimony oxides such as antimony trioxide, antimony tetraoxide, and antimony pentaoxide; tin dioxide, zirconium oxide, molybdenum oxide), metal halides such as antimony halides, metal salts such as sodium antimonate, metal hydroxides (e.g., aluminum hydroxide, magnesium hydroxide), and borates (e.g., zinc metaborate, barium borate). These flame retardant auxiliaries (E) can be used either singly or in combination.

The content of the flame retardant auxiliary (E) is, relative to 100 parts by weight of the thermoplastic polyester resin (A), about 0.1 to 20 parts by weight, preferably about 1 to 10 parts by weight, more preferably about 2 to 7 parts by weight. If the amount of the flame retardant auxiliary added is smaller than 0.1 part by weight, the flame retardancy of the composition is hardly improved. If the amount is larger than 20 parts by weight, the strength of the composition tends to be lowered.

Incidentally, depending on their intended uses, shaped articles are sometimes required to be those classified as "V-O" determined by UL Standard No. 94 for flammability. In this case, it is preferred that asbestos, a fluorine-containing resin, or the like is used together with the flame retardant. Included among the examples of the fluorine-containing resin are homo- or copolymers of fluorine-containing monomers such as tetrafluoroethylene, chlorotrifluoroethylene, vinylidene fluoride, hexafluoropropylene, and perfluoroalkyl vinyl ether; and co-polymers of the fluorine-containing monomers with copolymerizable monomers such as ethylene, propylene, and (meth)acrylate. Examples of such fluorine-containing resins are homopolymers such as polytetrafluoroethylene, poly chlorotrifluoroethylene, and polyvinylidene fluoride; copolymers such as tetrafluoroethylene-hexafluoropropylene copolymer, tetrafluoroethylene-perfluoroalkyl vinyl ether copolymer, ethylene-tetrafluoroethylene copolymer, and ethylene-chlorotrifluoroethylene copolymer. These fluorine-containing resins can be used either singly or in combination. Moreover, these fluorine-containing resins can be used in powder or particle form. The amount of the fluorine-containing resin added is, relative to 100 parts by weight of the polyester-series resin, about 0.1 to 10 parts by weight, preferably about 0.1 to 5 parts by weight, more preferably about 0.2 to 1 part by weight.

The composition of the present invention may comprise a variety of additives. The stability of the composition is enhanced by further addition of a known stabilizer (e.g., antioxidants, ultraviolet ray absorbers, light stabilizers). For example, by adding an antioxidant to the composition, shaped articles formed therefrom exhibit high heat stability, particularly stability over a long period of time and physical properties. As the antioxidant, compounds of hindered phenol-series, amine-series, and of thioether-series, and others are available. For improving the smoothness of feed of a starting material(s) in a molding step such as extrusion molding, addition of a lubricant is advantageous.

Moreover, if necessary, a coloring agent, a mould release agent, a nucleation agent, an antistatic agent, a surfactant, a polymer of another kind, a filler (e.g., an inorganic, organic, or metal filler (fibrous, particulate, or plate-like)), or the like may be used singly or in mixture.

The polyester resin composition of the present invention is easily prepared by mixing the components (A) to (C), the component (D) if necessary, and the component (E). The polyester resin composition of the present invention can be prepared by, for example, a process in which, after all components have been mixed together, the mixture is kneaded and extruded in pellets by a uniaxial or biaxial extruder, or a process in which pellets (master batch) different in composition are previously prepared and mixed in predetermined proportions. In preparing the composition of the present invention, dispersion of an additive(s) is improved by crushing part of or all the components, mixing the component(s) thus crushed with other non-crushed components, and kneading the mixture followed by extrusion. In the case where a liquid aliphatic ester (C) is used, a process in which the components are mixed with a lubricant in advance and the mixture of components is impregnated with the liquid aliphatic ester (C) and then extruded also makes the preparation of the composition easier and improves the processability and sliding characteristics, and therefore, is preferable.

The sliding member of the present invention can be fabricated by molding the polyester resin composition and/ or processing the composition. Such a conventional molding process as injection molding can be utilized. The shaped article thus obtained has high abrasion/wear resistant properties and excellent sliding characteristics not only against metals but resins. This shaped article is also excellent in dimensional accuracy. Therefore, the present invention provides a resin composition with improved sliding characteristics and is useful as a process for improving the sliding characteristics of the shaped article. Moreover, the shaped article of the present invention is useful as a gear of any type (e.g., idler gear) and suitably used as a sliding member in the fields of audio visual (AV), office automation (OA).

INDUSTRIAL APPLICABILITY

In the present invention, since a thermoplastic polyester resin (A), a modified olefinic polymer (B), and an aliphatic ester having a molecular weight of 400 to 1,000 are used in combination, dimensional accuracy and sliding characteristics are improved. Moreover, the addition of a flame retardant improves flame retardancy as well as dimensional accuracy and sliding characteristics. Therefore, the resin composition of the present invention is useful in molding a sliding member.

EXAMPLES

The following examples are intended to describe the present invention in further detail and should by no means be construed as defining the scope of the invention.

The physical properties of the shaped articles of the examples were evaluated in the following manner.

[Degree of Delamination and Measuring Accuracy of the Shaped Article]

An evaluation test piece (50 mm×50 mm×1 mm, diameter 1 mm center pingate process) was fabricated under the following condition, and its surface condition, i.e., the degree of delamination, was evaluated in five grades. Moreover, upon molding, the measurement smoothness (clogging of the pellets in the screw of the molding machine) of each composition in pellet form was evaluated and classified into five grades.

Molding Conditions
- Injection molding machine: Nikko J75SA
- Cylinder temperature (°C): 250-250-230-210
- Mold face temperature (°C): 60
- Rate of injection (m/min.): 1.0
- Primary pressure (MPa): 90
- Secondary pressure (MPa): 60
- Molding cycle (sec.): 20 to 10

[Evaluation Criteria of the Degree of Delamination of the Shaped Article]
1: Severe delamination over the shaped article
2: Delamination over the shaped article
3: Delamination only at the gate
4: Slight delamination at the gate
5: No delamination

[Evaluation Criteria of Measurement Smoothness Upon Molding]
1: unable to measure
2: measuring time 31 seconds or longer
3: measuring time 21 to 30 seconds
4: measuring time 15 to 20 seconds
5: the same as in the case with an additive-free polybutylene terephthalate resin (15 seconds or shorter)

[Sliding Characteristics Against Steel]

Under the following conditions, a thrust-type sliding testing apparatus imparted sliding motions to a test piece of steel (S55C) and a test piece made of a test material, and the coefficient of dynamic friction ($\mu$) and the specific wear loss (the volume of wear ($mm^3$) per unit load (N) and unit slide distance (km)) of each test piece were evaluated. The specific wear loss was calculated through the measurement of wear loss (mg).

Sliding Conditions
- Testing apparatus: thrust-type wear testing apparatus (Orientech, Co., Ltd.)
- Surface pressure: 0.98 MPa
- Linear velocity: 30 cm/sec.
- Sliding time: 24 hours

[Wear-Resistance]

Under the following conditions, the sliding characteristics of the gears of the same material were tested using a gear sliding testing apparatus, and the wear loss was evaluated based on the difference in weight of each gear before and after being imparted sliding motions.

Testing apparatus: Gear abrasion/wear tester (manufactured by to Toamech. Co., Ltd.)
- Gear: standard spur gear
- Module: 1.0
- The number of teeth: 23/54
- Face width: 5 mm Test Conditions
- Torque: 0.55 N·m
- The number of rotations: 1,000 rpm
- The number of repetition: 2,000,000 times
- Backlash: 150 $\mu$m

[Circularity of Gear]

The circularity of the gear with the number of teeth=54, module=1.0, and face width=10 mm (three-point pingate metal mould) was measured by a Tarilonde measuring apparatus.

[Flammability Test (UL-94)]

In accordance with Subject 94 (UL-94) of Underwriters Laboratories, the combustibility and the dropping characteristics of the resin upon combustion were tested using five test pieces (thickness 0.8 mm) to determine their ratings of combustibility.

Examples 1 to 10 and Comparative Examples 1 to 5

After a polyester resin (A), a modified olefinic polymer (B), and an aliphatic ester (C) had been mixed together in proportions shown in Table 1 or 2, the mixture was melt-kneaded by a biaxial extruder to prepare a composition in the form of pellets. Thereafter, a test piece was fabricated from the pellets by injection molding and evaluated. The results are shown in Table 1 and Table 2.

The materials used in Examples and Comparative Examples are shown below.

(A) PBT: polybutylene terephthalate (intrinsic viscosity 1.0) (Polyplastics, Co. Ltd.)

(B) MAH-PE (1) [=maleic anhydride-modified polyethylene (maleic anhydride content=2.5% by weight): N Tafmer MM6850 (Mitsui Kagaku K.K.)

MAH-PE (2) [=maleic anhydride-modified polyethylene (maleic anhydride content=1.0% by weight)]: N Tafmer MP0620 (Mitsui Kagaku K.K.)

MAH-EEA [=maleic anhydride-modified (ethylene-ethyl acrylate copolymer) (maleic anhydride content=2.5% by weight)]: AR201 (Mitsui-Du Pont Chemicals Co., Ltd.)

PE [=polyethylene]: Milason 403P (Mitsui Kagaku, K.K)

(C) tridecyl stearate, myristyl myristate, ethylene glycol distearate, behenyl behenate, glycerol tristearate (D) polypentabromobenzyl acrylate, tetrabromo bisphenol A carbonate oligomer (E) antimony trioxide

TABLE 1

| Examples | | 1 | 2 | 3 | 4 | 5 | 6 | 7 | 8 | 9 | 10 |
|---|---|---|---|---|---|---|---|---|---|---|---|
| (A) PBT | (parts by weight) | 100 | 100 | 100 | 100 | 100 | 100 | 100 | 100 | 100 | 100 |
| (B) | (parts by weight) | | | | | | | | | | |
| MAH-PE (1) | (MAH = 2.5 wt. %) | 5 | 2 | 8 | | | 5 | 5 | 5 | 5 | 5 |
| MAH-PE (2) | (MAH = 1.0 wt. %) | | | | 5 | | | | | | |
| MAH-EEA | (MAH = 2.5 wt. %) | | | | | 5 | | | | | |
| (C) | (parts by weight) | | | | | | | | | | |
| tridecyl stearate | MW = 466 | 2 | 2 | 2 | 2 | 2 | | | | | 4 |

TABLE 1-continued

| Examples | | 1 | 2 | 3 | 4 | 5 | 6 | 7 | 8 | 9 | 10 |
|---|---|---|---|---|---|---|---|---|---|---|---|
| myristyl myristate | MW = 480 | | | | | | 2 | | | | |
| ethylene glycol distearate | MW = 594 | | | | | | | 2 | | | |
| behenyl behenate | MW = 648 | | | | | | | | 2 | | |
| glycerol tristearate | MW = 890 | | | | | | | | | 2 | |
| Degree of delamination | | 5 | 5 | 5 | 5 | 5 | 5 | 5 | 5 | 5 | 5 |
| Measurement smoothness | | 5 | 5 | 5 | 5 | 5 | 5 | 5 | 5 | 5 | 5 |
| Sliding characteristics against steel | | | | | | | | | | | |
| $\mu$ | | 0.20 | 0.28 | 0.20 | 0.20 | 0.25 | 0.21 | 0.21 | 0.22 | 0.24 | 0.18 |
| Specific wear loss (mm$^3$/(N · km)) | | 0.30 | 0.40 | 0.30 | 0.30 | 0.50 | 0.30 | 0.30 | 0.35 | 0.40 | 0.20 |
| Wear resistance against the gear of the same material Wear loss (mg) | | | | | | | | | | | |
| stationary gear | | 3.5 | 5.6 | 2.7 | 3.5 | 2.0 | 3.5 | 4.0 | 4.0 | 5.0 | 4.0 |
| moving gear | | 3.4 | 6.2 | 2.0 | 3.3 | 2.5 | 3.3 | 3.7 | 4.0 | 5.0 | 3.8 |
| Circularity | | 12 | 10 | 15 | 12 | 12 | 12 | 12 | 12 | 12 | 10 |

PBT Polybutylene terephthalate (intrinsic viscosity 1.0) manufactured by Polyplastics Co., Ltd.
MAH-PE (1) N Tafmer MM6850 manufactured by Mitsui Kagaku K.K.
MAH-PE (2) N Tafmer MP0620 manufactured by Mitsui Kagaku K.K.
MAH-EEA AR 201 manufactured by Mitsui-Du Pont Polychemicals, Co., Ltd.

TABLE 2

| Comparative Examples | | 1 | 2 | 3 | 4 | 5 |
|---|---|---|---|---|---|---|
| (A) PBT | (parts by weight) | 100 | 100 | 100 | 100 | 100 |
| (B) PE | (parts by weight) | | | | | 5 |
| MAH-PE (1) | (MAH = 2.5 wt. %) | | 5 | 5 | 5 | |
| (C) | (parts by weight) | | | | | |
| tridecyl stearate | MW = 466 | 2 | | | | 2 |
| lauryl laurate | MW = 368 | | | 2 | | |
| pentaerythritol tetrastearate | MW = 1,200 | | | | 2 | |
| Degree of delamination | | 5 | 5 | 5 | 5 | 1 |
| Measuring smoothness | | 3 | 5 | 2 | 5 | 5 |
| Sliding characteristics against steel | | | | | | |
| $\mu$ | | 0.3 | 0.38 | 0.18 | 0.35 | 0.35 |
| Specific wear loss (mm$^3$/(N · km)) | | 0.8 | 1.7 | 0.8 | 1.5 | 1.6 |
| Wear resistance against the gear of the same material Wear loss (mg) | | | | | | |
| stationary gear | | 10 | 9 | 3.8 | 10 | 23.2 |
| moving gear | | 9.8 | 8.5 | 3.7 | 8.8 | 28 |
| Circularity | | 8 | 12 | 12 | 12 | 25 |

PE Misorane 403P manufactured by Mitsui Kagaku, K.K.

Examples 11 to 21 and Comparative Examples 6 to 10

After a polyester resin (A), a modified olefinic polymer (B), an aliphatic ester (C), a flame retardant (D), and a flame retardant auxiliary (E) had been mixed together in proportions shown in Table 3 or Table 4, the mixture was melt-kneaded by a biaxial extruder to prepare a composition in the form of pellets. Thereafter, test pieces were fabricated from these pellets by injection molding and evaluated. The results are shown in Table 3 and Table 4.

TABLE 3

| Examples | | 11 | 12 | 13 | 14 | 15 | 16 | 17 | 18 | 19 | 20 | 21 |
|---|---|---|---|---|---|---|---|---|---|---|---|---|
| (A) PBT | (parts by weight) | 100 | 100 | 100 | 100 | 100 | 100 | 100 | 100 | 100 | 100 | 100 |
| (B) MAH-PE (1) | (parts by weight) (MAH = 2.5 wt. %) | 5 | 2 | 8 | | | 5 | 5 | 5 | 5 | 5 | 5 |

TABLE 3-continued

| Examples | | 11 | 12 | 13 | 14 | 15 | 16 | 17 | 18 | 19 | 20 | 21 |
|---|---|---|---|---|---|---|---|---|---|---|---|---|
| MAH-PE (2) | (MAH = 1.0 wt. %) | | | | 5 | | | | | | | |
| MAH-EEA | (MAH = 2.5 wt. %) | | | | | 5 | | | | | | |
| (C) | (parts by weight) | | | | | | | | | | 4 | 4 |
| tridecyl stearete | MW = 466 | 2 | 2 | 2 | 2 | 2 | | | | | | |
| myristyl myristate | MW = 480 | | | | | | 2 | | | | | |
| ethylene glycol distearete | MW = 594 | | | | | | | 2 | | | | |
| behenyl behenate | MW = 648 | | | | | | | | 2 | | | |
| glycerol tristearate | MW = 890 | | | | | | | | | 2 | | |
| (D) | (parts by weight) | | | | | | | | | | | |
| polypentabromobenzyl acrylate | | 15 | 15 | 15 | 15 | 15 | 15 | 15 | 15 | 15 | 15 | |
| tetrabromo bisphenol A carbonate oligomer | | | | | | | | | | | | 20 |
| (E) | (parts by weight) | | | | | | | | | | | |
| antimony trioxide | | 5 | 5 | 5 | 5 | 5 | 5 | 5 | 5 | 5 | 5 | 5 |
| Degree of delamination | | 5 | 5 | 5 | 5 | 5 | 5 | 5 | 5 | 5 | 5 | 5 |
| Measurement smoothness | | 5 | 5 | 5 | 5 | 5 | 5 | 5 | 5 | 5 | 5 | 5 |
| Sliding characteristics against steel | | | | | | | | | | | | |
| $\mu$ | | 0.21 | 0.29 | 0.2 | 0.2 | 0.26 | 0.2 | 0.22 | 0.23 | 0.24 | 0.18 | 0.25 |
| Specific wear loss ($mm^3/(N \cdot km)$) | | 0.43 | 0.6 | 0.5 | 0.45 | 0.6 | 0.3 | 0.3 | 0.4 | 0.6 | 0.3 | 0.48 |
| Wear resistance against the gear of the same material Wear loss (mg) | | | | | | | | | | | | |
| stationary gear | | 2.0 | 3.2 | 2.0 | 3.0 | 1.0 | 2.1 | 2.0 | 2.3 | 2.4 | 3.0 | 2.5 |
| moving gear | | 1.0 | 3.7 | 1.0 | 3.2 | 1.0 | 0.8 | 1.2 | 1.7 | 1.8 | 2.0 | 1.8 |
| Circularity | | 20 | 18 | 25 | 20 | 20 | 20 | 20 | 20 | 20 | 20 | 25 |
| Combustibility (UL 94) thickness 0.8 mm | | V-0 | V-O | V-0 | V-0 | V-0 | V-0 | V-0 | V-0 | V-0 | V-0 | V-0 |

TABLE 4

| Comparative Examples | | 6 | 7 | 8 | 9 | 10 |
|---|---|---|---|---|---|---|
| (A) PBT | (parts by weight) | 100 | 100 | 100 | 100 | 100 |
| (B) PE | (parts by weight) | | | | | 5 |
| MAH-PE (1) | (MAH = 2.5 wt. %) | | 5 | 5 | 5 | |
| (C) | (parts by weight) | | | | | |
| tridecyl stearate | MW = 466 | 2 | | | | 2 |
| lauryl laurate | MW = 368 | | | 2 | | |
| pentaerythritol tetrastearate | MW = 1,200 | | | | 2 | |
| (D) | (parts by weight) | | | | | |
| polypentabromobenzyl acrylate | | 15 | 15 | 15 | 15 | 15 |
| tetrabromo bisphenol A carbonate oligomer | | | | | | |
| (E) | (parts by weight) | | | | | |
| antimony trioxide | | 5 | 5 | 5 | 5 | 5 |
| Degree of delamination | | 5 | 5 | 5 | 5 | 2 |
| Measurement smoothness | | 3 | 5 | 2 | 5 | 5 |
| Sliding characteristics against steel | | | | | | |
| $\mu$ | | 0.43 | 0.41 | 0.19 | 0.43 | 0.42 |
| Specific delamination loss ($mm^3(N \cdot km)$) | | 0.85 | 1.65 | 0.90 | 1.70 | 2.10 |
| Wear resistance against the gear of the same material Wear loss (mg) | | | | | | |
| stationary gear | | 22 | 7 | 2.5 | 6.2 | 20.3 |
| moving gear | | 18.2 | 5.8 | 3.2 | 5.3 | 19.2 |
| Circularity | | 18 | 20 | 20 | 20 | 35 |
| Combustibility (UL 94) thickness 0.8 mm | | V-0 | V-O | V-0 | V-0 | V-0 |

What is claimed is:

1. A polyester resin composition which is substantially free from a bisoxazoline compound and comprises: (A) a thermoplastic polyester resin, (B) an olefinic polymer modified with at least one member selected from the group consisting of an unsaturated carboxylic acid and acid anhydride thereof, and (C) an aliphatic ester having a molecular weight of 400 to 1,000, wherein the ratio of the modified olefinic polymer (B) to the aliphatic ester (C) is the former/the latter (weight ratio)=95/5 to 30/70 and the amount of the aliphatic ester (C) is 0.5 to 5 parts by weight relative to 100 parts by weight of the thermoplastic polyester resin (A).

2. A polyester resin composition according to claim 1, wherein the thermoplastic polyester resin (A) is a polyalkylene arylate-series resin.

3. A polyester resin composition according to claim 2, wherein the polyalkylene arylate-series resin is a polybutylene terephthalate-series resin.

4. A polyester resin composition according to claim 1, wherein the modified olefinic polymer (B) is an olefinic polymer (b-1) modified with an unsaturated carboxylic acid or acid anhydride thereof (b-2).

5. A polyester resin composition according to claim 4, wherein the unsaturated carboxylic acid or acid anhydride thereof (b-2) is at least one member selected from the group consisting of maleic anhydride and (meth)acrylic acid.

6. A polyester resin composition according to claim 5, wherein the degree of modification of the modified olefinic polymer (B) by at least one member selected from the group consisting of maleic anhydride and (meth)acrylic acid is 0.1 to 5% by weight.

7. A polyester resin composition according to claim 4, wherein the olefinic polymer (b-1) comprises a homo- or copolymer of an olefinic monomer, or a copolymer of the olefinic monomer and an α, β-unsaturated carboxylic acid ester.

8. A polyester resin composition according to claim 7, wherein the olefinic monomer comprises ethylene or propylene.

9. A polyester resin composition according to claim 7, wherein the olefinic polymer (b-1) comprises at least one member selected from the group consisting of polyethylene, polypropylene, ethylene-propylene copolymer, ethylenemethyl (meth)acrylate copolymer, and ethylene-ethyl (meth)acrylate copolymer.

10. A polyester resin composition according to claim 1, wherein the modified olefinic polymer (B) is a graft copolymer being polyethylene onto which maleic anhydride is grafted.

11. A polyester resin composition according to claim 1, wherein the molecular weight of the aliphatic ester (C) is 420 to 900.

12. A polyester resin composition according to claim 1, wherein the aliphatic ester (C) is an ester of a straight-chain $C_{10-30}$ fatty acid with at least one alcohol selected from the group consisting of a straight-chain $C_{8-30}$ aliphatic alcohol, a $C_{2-20}$ alkylenediol, a $C_{3-8}$ alkanetriol, and a $C_{4-8}$ alkanetetraol.

13. A polyester resin composition according to claim 1, which comprises, relative to 100 parts by weight of the thermoplastic polyester resin (A), 0.5 to 18 parts by weight of the modified olefinic polymer (B) and 0.2 to 8 parts by weight of the aliphatic ester (C).

14. A polyester resin composition according to claim 1, which comprises, relative to 100 parts by weight of a polybutylene terephthalate-series resin (A), (B) 1 to 10 parts by weight of polyethylene or ethylene-ethyl acrylate co-polymer modified with at least one member selected from the group consisting of maleic anhydride and (meth)acrylic acid, and (C) 0.2 to 8 parts by weight of an aliphatic ester having a molecular weight of 400 to 1,000 of a saturated $C_{12-26}$ fatty acid with at least one saturated aliphatic alcohol selected from the group consisting of a saturated $C_{10-26}$ aliphatic alcohol, a $C_{2-10}$ alkylenediol, a $C_{3-6}$ alkanetriol, and a $C_{4-6}$ alkanetetraol, wherein the degree of modification of the component (B) by at least one unsaturated carboxylic acid selected from the group consisting of maleic anhydride and (meth)acrylic acid is 0.1 to 4% by weight.

15. A polyester resin composition according to claim 1, wherein the modified olefinic polymer (B) is a graft copolymer being a polyethylene on to which an unsaturated carboxylic acid or acid anhydride thereof is grafted; the aliphatic ester (C) is an ester of a straight-chain saturated $C_{12-26}$ fatty acid with a straight-chain saturated $C_{10-26}$ aliphatic alcohol, a $C_{2-10}$ alkylenediol, a $C_{3-6}$ alkanetriol, or a $C_{4-6}$ alkanetetraol; and the amount of introduction of the unsaturated carboxylic acid or acid anhydride thereof into the graft copolymer is 0.1 to 4% by weight.

16. A polyester resin composition according to claim 1, which comprises a flame retardant (D).

17. A polyester resin composition according to claim 16, which further comprises a flame retardant auxiliary (E).

18. A polyester resin composition according to claim 17, which comprises, relative to 100 parts by weight of the thermoplastic polyester resin (A), 0.5 to 25 parts by weight of the flame retardant (D) and 0.1 to 20 parts by weight of the flame retardant auxiliary (E).

19. A polyester resin composition according to claim 16, wherein the flame retardant (D) is a halogen-containing organic flame retardant.

20. A resin composition which is substantially free from a bisoxazoline compound and has improved sliding characteristics, comprising: (A) a polybutylene terephthalate-series resin as a base resin, (B) an olefinic polymer modified with at least one member selected from the group consisting of an unsaturated carboxylic acid and acid anhydride thereof, and (C) an aliphatic ester having a molecular weight of 400 to 1,000, wherein the ratio of the modified olefinic polymer (B) to the aliphatic ester (C) is the former/the latter (weight ratio)=95/5 to 30/70 and the amount of the aliphatic ester (C) is 0.5 to 5 parts by weight relative to 100 parts by weight of the polybutylene terephthalate-series resin (A).

21. A process for producing a thermoplastic polyester resin composition being substantially free from a bisoxazoline compound, which comprises mixing: (A) a thermoplastic polyester resin, (B) an olefinic polymer modified with at least one member selected from the group consisting of an unsaturated carboxylic acid and acid anhydride thereof, and (C) an aliphatic ester having a molecular weight of 400 to 1,000, wherein the ratio of the modified olefinic polymer (B) to the aliphatic ester (C) is the former/the latter (weight ratio)=95/5 to 30/70 and the amount of the aliphatic ester (C) is 0.5 to 5 parts by weight relative to 100 parts by weight of the thermoplastic polyester resin.(A).

22. A sliding member formed from a polyester resin composition recited in claim 1.

23. A sliding member according to claim 22, which is a gear.

24. A method for improving the sliding characteristics of a shaped article, wherein the shaped article is formed from a polyester resin composition being substantially free from a bisoxazoline compound and comprising: (A) a thermoplastic polyester resin, (B) an olefinic polymer modified with at least one member selected from the group consisting of an unsaturated carboxylic acid and acid anhydride thereof, and (C) an aliphatic ester having a molecular weight of 400 to 1,000 wherein the ratio of the modified olefinic polymer (B) to the aliphatic ester (C) is the former/the latter (weight ratio)=95/5 to 30/70 and the amount of the aliphatic ester (C) is 0.5 to 5 parts by weight relative to 100 parts by weight of the thermoplastic polyester resin (A).

25. A polyester resin composition which is substantially free from a bisoxazoline compound and comprises: (A) a thermoplastic polyester resin, (B) an olefinic polymer modified with maleic anhydride, and (C) an aliphatic ester having a molecular weight of 400 to 1,000, wherein the ratio of the modified olefinic polymer (B) to the aliphatic ester (C) is the former/the latter (weight ratio)=95/5 to 30/70, the amount of the aliphatic ester (C) is 0.5 to 5 parts by weight relative to 100 parts by weight of the thermoplastic polyester resin (A) and the degree of modification of the modified olefinic polymer (B) by maleic anhydride is 0.1 to 5% by weight.

* * * * *